United States Patent
Arthur

[15] 3,684,271
[45] Aug. 15, 1972

[54] SHOCK ABSORBING DEVICE FOR DRAFT GEAR

[72] Inventor: Gene M. Arthur, Norwalk, Ohio
[73] Assignee: Clevite Corporation
[22] Filed: Oct. 9, 1970
[21] Appl. No.: 79,512

[52] U.S. Cl. .................................. 267/152, 267/63
[51] Int. Cl. .............................................. F16f 1/40
[58] Field of Search ..................... 267/138, 152, 63

[56] References Cited

UNITED STATES PATENTS 3,504,901  4/1970  Ditty ......................... 267/138
3,416,783  12/1968  Tondato .................... 267/152

Primary Examiner—James B. Marbert
Attorney—Edward E. Sachs

[57] ABSTRACT

A shock absorbing device for railroad draft gear having a pair of metal side plates with a rubber-like pad sandwiched therebetween. The pad, in general, has the same outline form as the plates except that the peripheral face terminates spaced from the peripheral edges of the plates. The pad has two circumferentially continuous, convexedly extending ridges between its axial ends.

6 Claims, 5 Drawing Figures

PATENTED AUG 15 1972  3,684,271

INVENTOR
GENE M. ARTHUR
BY
ATTORNEY

3,684,271

SHOCK ABSORBING DEVICE FOR DRAFT GEAR

This invention relates generally to a shock absorbing device and, more particularly, to a resilient shock absorber adapted for use in railroad draft gears.

Shock attenuating or absorbing devices of the type hereinabove referred to are well known in the art and are commonly composed of two axially spaced end plates with a pad of rubber or rubber-like material adhesively secured therebetween. Considerable attention has been paid to the geometric configuration of the rubber pad as the same is an important factor determining the effectiveness of the shock absorber and the work life thereof.

Theoretically, such a device would be considered nearly perfect if, in response to forces acting upon the same, the rubber would completely fill the voids between the plates without extending beyond the outer diameter of the plates and without the deflection and deformation of the elastic material having any detrimental effect upon the adhesive bond which secures the rubber to the metal plates. This objective, however, cannot be achieved as there will always be a shear stress in the rubber, particularly in the region adjacent to the metal plates.

In order to provide for the volumetric expansion of the rubber, there is usually provided in devices of the prior art, a pad having either internal cavities or an external contour with deep undercuts. The smallest outside diameter of the pad is usually located proximate to the axial center of the pad. A design of the latter type has been widely accepted in the industry inasmuch as the same provides the required degree of deflection. However, consistent problems have occurred in the region of the rubber adjacent to the metal plates due to shear stresses which have had an unduly detrimental effect upon the bond between the metal and the rubber. This problem particularly affects those areas in which a substantial flow of material occurs. The resistance to shear movement is in turn related to the total bonded area.

Also known in the art are draft gears in which the above-described rubber pad substantially fills the area between the plates without any significant undercut. The contour level of the outside surface of the rubber pad being either straight or consisting of a single slight curved surface. These draft gears are usually employed in applications where the amount of force which is applied upon the draft gear is significantly less so that an outpouring of the rubber from between the plates does not normally occur and therefore the set of conditions under which the draft gear must operate is different.

In the context of this invention, the words "rubber," "rubber-like" or "elastomeric material" are used interchangeably herein and are intended to convey the same meaning.

It is the primary object of the present invention to provide a draft gear which includes a set of metal plates with an elastomeric pad disposed therebetween in which the bond between the pad and the metal plates comprises an area which is significantly less than the bonded area heretofore required in draft gears for similar applications.

It is another object of the present invention to provide a draft gear of the type hereinabove described in which the flow of the rubber-like material, adjacent to the edges which heretofore have frequently become overstressed, is substantially reduced.

An aspect of the present invention resides in the provision of a railroad draft gear which includes a pair of metal plates and in which a pad of elastomeric material is interposed between and bonded to the sides of the plates. The pad corresponds in outline form generally to that of the plates except for the peripheral face thereof which terminates spaced from the edge of the plates. The peripheral face of the pad embodies a plurality of outwardly extending ridges between the axial ends of the pad.

For a better understanding of the present invention, together with other and further objects thereof, reference is had to the following description taken in connection with the accompanying drawings, and its scope will be pointed out in the appended claims.

Figure 3:
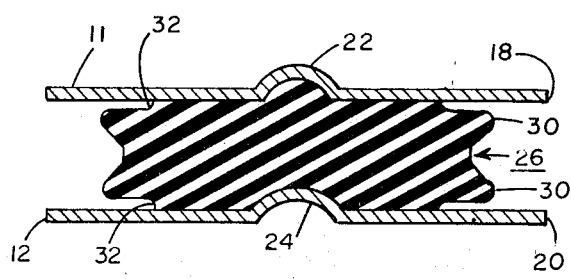
Figure 1:
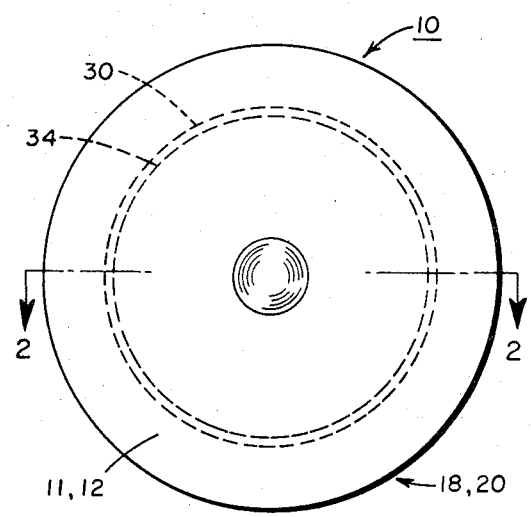
FIG. 1 is a plan view of the shock absorber in accordance with the invention.
Figure 4:
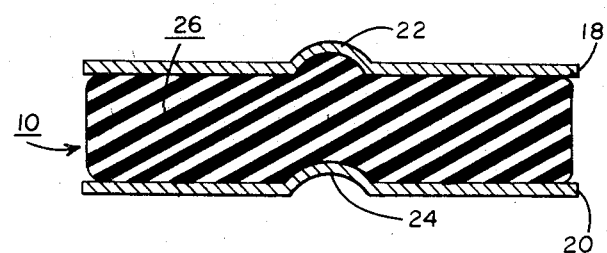
Figure 5:
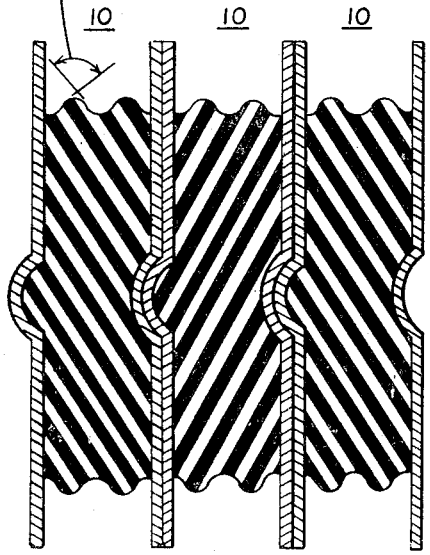

FIGS. 3 and 4 are vertical cross-sectional views taken along lines 3—3 of FIG. 1 which shows operational stages of the shock absorber; and FIG. 5 is a view similar to FIGS. 3 and 4 but shows a set of shock absorbers.

Figure 2:
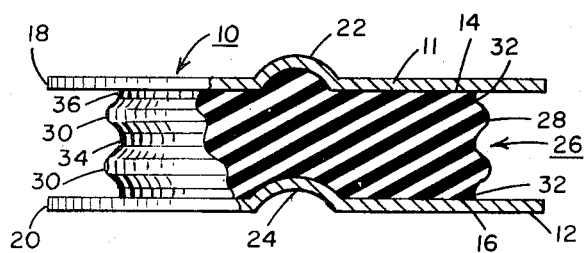
FIG. 2 is a fragmentary side view of the invention shown in FIG. 1.

Referring now to the drawing, and particularly FIGS. 1 and 2 thereof, there is shown a shock absorber 10 comprising a pair of metal plates 11, 12 having a generally circular configuration and peripheral edges 18, 20. The plates 11, 12 are of complementary configuration and design and are axially spaced with respect to each other. Each plate is provided with an indentation 22, 24 which is located proximate to the axial center of the device 10. The plates are arranged in such a manner that one indentation, see 22, projects outwardly and the other indentation is arranged parallel so that in the final assembly the indentation 24 projects inwardly.

Interposed between the plates 11 and 12 is a pad 26 composed of elastomeric material having a peripheral outline generally similar to the outline of the plates 11, 12 except as hereinafter further delineated. The pad 26 and, more particularly, its axial sides 14, 16 thereof, is adhesively secured to the plates 11, 12 in order to establish a secure bond. Numerous bonding techniques are well known in the art and are well suited to satisfy the requirements.

The peripheral face 28 of the pad 26 terminates in spaced relation from the edges 18 and 20 of the plates 11 and 12, respectively. The distance between the face 28 and the edges is calculated to satisfy the individual design criterias. However, in any case, the face is provided with two convex ridges 30 between its axial ends with their peripheral peak exceeding, or at least being equal to, the heights of the edges 32 of the pad which constitute the axial extremities of the latter which is bonded to the plate.

The ridges 30 are peripherally continuous and each thereof has a curvature approximating 90°. This curvature may be varied slightly depending upon the type of material which is to be used for making the pad 26.

It will be observed that the peripheral area of the pad adjacent to the plates is not a relatively thin wall as is the common practice in the prior art. The curvature of the edge 32 is generally similar to the curvature of the valley 34 established between the ridges 30, and the bottom surface 36 of the edge portion is substantially in the same plane as the bottom of the valley 34 formed by and between the two adjacent ridges.

Due to the configuration of the edge portion 32 of the pad 26 the degree of stress which is established upon loading the shock absorber is significantly less inasmuch as the relative quantity of rubber which is caused to flow is substantially reduced.

Moreover, the curvature of the valley 34 is generally a concave reproduction of the convex ridges 30.

It has been found through elaborate testing that a shock absorber for the purpose as herein delineated provides optimum operating characteristics when the pad is provided with two peripheral ridges, see 30.

FIGS. 3 and 4 illustrate two operating stages of the shock absorber 10. FIG. 3 serves mainly to illustrate that upon initial deflection or compression of the rubber pad 26 between the plates 11 and 12 the elastomeric material is elongated in a radial direction mainly in the intermediate area and the edge portions 32 are not at all affected. It will be seen that the ridges 30 are elongated and are further spread apart.

FIG. 4 illustrates the final stage of compression of the shock absorber. The pad has now been elongated to a degree causing the elastomeric material to completely fill out the area between the two plates thereby establishing a surface outline which is almost flush with the edge portions 18, 20 of the plates.

As is well known, shock absorbers of the type hereinunder consideration are axially compressed causing a movement by the plates 11, 12 thereby flattening the elastomeric material until a maximum state of compression is reached, as shown in FIG. 4, with the edges 18, 20 being flush with the elastomeric material of the pad 26 generally throughout the periphery of the latter.

FIG. 5 shows a set of shock absorbers composed of a plurality of devices hereinabove described. In conventional applications a complete shock absorber for a draft gear is usually comprised of three or more individual units.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A shock absorbing device for railway draft gear, comprising:
    a pair of metal plates having sides and ends;
    a pad of elastomeric material interposed between and bonded to the sides of said plates; said pad corresponding in outline form generally to said plates except the peripheral face thereof terminating spaced from the edge of the plates; the face of said pad having a plurality of convexedly extending ridges between and axially spaced from its ends.

2. A shock absorbing device according to claim 1, wherein the peripheral peak of the ridges exceeds or is at least equal to the heights of the edges of the pad bonded to the plates.

3. A shock absorbing device according to claim 1, wherein the curvature of the ridges is substantially similar to curvature of the valleys between the ridges.

4. A shock absorbing device according to claim 1, wherein said pad has two ridges.

5. A shock absorbing device according to claim 1, wherein the edge portions of the pad adjacent to the metal plates include a valley having a bottom surface substantially in the same plane as the bottom of the valley formed by and between two adjacent ridges.

6. A shock absorbing device according to claim 1, wherein each ridge has an angle of incline of approximately 90°.

* * * * *